United States Patent
Suwa et al.

(10) Patent No.: US 9,053,261 B2
(45) Date of Patent: Jun. 9, 2015

(54) SIMULATION METHOD AND SIMULATION APPARATUS

(75) Inventors: Tamon Suwa, Kawasaki (JP); Tomokazu Nakagawa, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 441 days.

(21) Appl. No.: 13/433,456

(22) Filed: Mar. 29, 2012

(65) Prior Publication Data

US 2012/0303338 A1    Nov. 29, 2012

(30) Foreign Application Priority Data

May 24, 2011    (JP) .................................. 2011-116344

(51) Int. Cl.
    G06F 17/10    (2006.01)
    G06G 7/48    (2006.01)
    G06F 17/50    (2006.01)

(52) U.S. Cl.
    CPC ........ *G06F 17/5009* (2013.01); *G06F 2217/16* (2013.01)

(58) Field of Classification Search
    CPC ............ G06F 17/5009; G06F 17/5018; G06F 17/5036; G06F 2217/16; E21B 21/08
    USPC ....................................................... 703/2, 6
    See application file for complete search history.

(56) References Cited

U.S. PATENT DOCUMENTS

2012/0284002 A1* 11/2012 McDaniel et al. ................ 703/2

OTHER PUBLICATIONS

Micky Kelager (Lagrange Fluid Dynamics Using Smoothed Particle Hydrodynamics, 2006 (88 pages).*
Sauro Manenti (A smoothed Particle Hydrodynamics: Basics and Application, 2009 (27 pages).*
Stefan Auer (Realtime particle-based fluid simulation, 2006 Thesis (79 pages)).*
Monaghan, J. J., "Smoothed Particle Hydrodynamics", Annu. Rev. Astron. Astrophys., vol. 30, pp. 543-574; 1992.
Suzuki, Yukihito et al., "Development of the Hamiltonian Moving Particle Semi-implicit Method", Transactions of JSCES, Paper No. 20050017; 2005 (with English translation).
Cleary, Paul W., "Modeling confined multi-material heat and mass flows using SPH", Applied Mathematical Modeling, vol. 22, pp. 981-993; 1998.
Gesteira, M. G. et al., "User Guide for the SPHysics Code", pp. 9-15; Sep. 2010.
Fang, Jiannong, et al., "Improved SPH methods for simulating free surface flows of viscous fluids"; Applied Numerical Mathematics, vol. 59, pp. 251-271; 2009.
Morris, J., et al., "Modeling Low Reynolds number incompressible flows using SPH", Journal of Computational Physics, vol. 136, pp. 214-226; 1997.

* cited by examiner

*Primary Examiner* — Kamini S Shah
*Assistant Examiner* — Andre Pierre Louis
(74) *Attorney, Agent, or Firm* — Fujitsu Patent Center

(57) ABSTRACT

To obtain velocity, density, pressure, and a position per unit time, acceleration of each particle and a repulsive force applied to each particle from a boundary surface is obtained by an equation of motion discretized by a predetermined kernel function; velocity after unit time is calculated by time integration; a density time differential is calculated by a discretized continuity equation representing a temporal change in the density based on a predetermined kernel function; density after unit time is calculated by time integration on the density time differential by using the velocity after the unit time; smoothing is performed on the density at predetermined intervals; pressure after unit time is calculated by an equation of state with the density after unit time; a position after unit time is calculated; the above calculations are repeated from the initial state to the end of a predetermined time.

11 Claims, 10 Drawing Sheets

| | WAVE HEIGHT OF OFFSHORE WAVE | CYCLE | HEIGHT OF REVETMENT | DEPTH OF WATER |
|---|---|---|---|---|
| INLAND-SEA CONDITION | 14.00 cm | 1.50 sec | 16.00 cm | 69.8 cm |
| OPEN-SEA CONDITION | 12.00 cm | 2.0 sec | 12.00 cm | 67.9 cm |

SIMULATION METHOD AND SIMULATION APPARATUS

CROSS-REFERENCE TO RELATED APPLICATION

This application is based upon and claims the benefit of priority of the prior Japanese Patent Application No. 2011-116344, filed on May 24, 2011, the entire contents of which are incorporated herein by reference.

FIELD

The embodiment discussed herein is directed to a simulation method and a simulation apparatus.

BACKGROUND

Conventionally, in the analysis of motion of a continuum to examine the flow of fluid, such as water or air, by using numerical calculations, i.e., in the fluid analysis, a technology called a particle method has been proposed. Specifically, the particle method is a technique in which the motion of a continuum is analyzed as the motion of a finite number of particles. Typical particle methods that have recently been proposed include the Smoothed Particle Hydrodynamics (SPH) method and the Moving Particle Semi-implicit (MPS) method. In the following, fluid, such as water or air, may be referred to as a "continuum".

As a standard technique used in the particle method, there is a known technique in which a region (hereinafter, described as an "influence region") is set in advance with respect to a particle of interest and a force applied to the particle of interest is obtained by calculating interactions between the particle of interest and other particles that are present in the influence region.

In particular, the feature of the SPH method used to express a continuum is that the physical quantities of a plurality of particles are approximated by a smoothing process using a weight function called a kernel function in order that a primitive equation is discretized. With the smoothing process, it becomes possible to eliminate a calculation process of cumbersome mesh operations including evaluation of the physical quantities on mesh points. Therefore, the SPH method is suitable for dealing with a free surface problem to analyze free surface flows or a multi-physics problem to analyze a plurality of physical phenomena represented by different governing equations.

Therefore, for example, the SPH method is considered to be suitable for estimation of the flow velocity and the impact pressure of sea waves that hit or overreach revetments.

Non-Patent Document 1: J. J Monaghan, "Smoothed Particle Hydrodynamics", Annu. Rec. Astron. Astrophys., Vol. 30, pp. 543-574

Non-Patent Document 2: Yukihito Suzuki, Seiichi Koshizuka, Yoshiaki Oka, "Development of Hamiltonian Moving Particle Semi-implicit (HMPS) Method (Implementation of a Symplectic Scheme", Trans. JSCES, Paper No. 20050017 (2005)

Non-Patent Document 3: Paul W. Cleary, "Modelling confined multi-material heat and mass flows using SPH", Appl. Math. Modelling, Vol. 22, pp. 981-993, 1998

Non-Patent Document 4: M. G. Gesteira, B. D. Rogers, R. A. Dalrymplem, A. J. C. Crespo, M. Narayanaswamy, "User Guide for the SPHysics Code, September 2010", pp. 9-15

Non-Patent Document 5: Fang, J., Parriaux, A., Rentschler, M., Ancey, C., "Improved SPH methods for simulating free surface flows of viscous fluids", Applied Numerical Mathematics, Vol. 59, pp. 251-271, 2009

Non-Patent Document 6: Morris, J., Fox, P. J., Zhu, Y., "Modeling Low Reynolds number incompressible flows using SPH", J. comp. Phys., Vol. 136, pp. 214-226, 1997

However, in the simulation using the conventional particle method, if surface wave propagation is dealt with for a long time, surface wave attenuation occurs. Regarding this matter, wave propagation was actually analyzed by using the standard SPH method, and it was found that large wave-height attenuation has occurred after a lapse of a predetermined time and wave generation tests was not be simulated. As described above, in the simulation using the conventional particle method, deviation from the reality becomes large. Therefore, it is difficult to reduce the number of hydraulics model tests of generating waves by a wave generation board that is set in an actual water tank.

SUMMARY

According to an aspect of an embodiment of the invention, a simulation method for analyzing a state of each of particles that constitute a set that represents a continuum, the simulation method includes calculating acceleration of each of the particles and a repulsive force applied to each of the particles from a boundary surface, by using an equation of motion that is discretized by a kernel function representing a degree of contribution of one of the particles to influence on the other particles on the basis of input initial values of velocity, density, pressure, and a position of each of the particles in an initial state; calculating velocity of each of the particles after a unit time by performing time integration on current velocity of each of the particles on the basis of the calculated acceleration and the calculated repulsive force of each of the particles; calculating a density time differential of each of the particles by using a continuity equation that is discretized by the kernel function so as to represent a temporal change in the density of the continuum; calculating density of each of the particles after the unit time by performing time integration on the calculated density time differential of each of the particle by using the velocity of each of the particles after the unit time; performing smoothing on the density of each of the particles after the unit time, once every predetermined number of calculations of the density of each of the particles; calculating pressure of each of the particles after the unit time by using an equation of state based on the density of each of the particles after the unit time; calculating a position of each of the particles after the unit time by performing time integration based on the velocity of each of the particles after the unit time; and acquiring velocity, density, pressure, and a position of each of the particles per unit time by repeating the calculations of the velocity, the density, the pressure, and the position of each of the particles from the initial state till an end of a predetermined time.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Preferred embodiments of the present invention will be explained with reference to accompanying drawings. The simulation method, and the simulation apparatus disclosed by the present application are not limited to the following embodiments.

Figure 1:
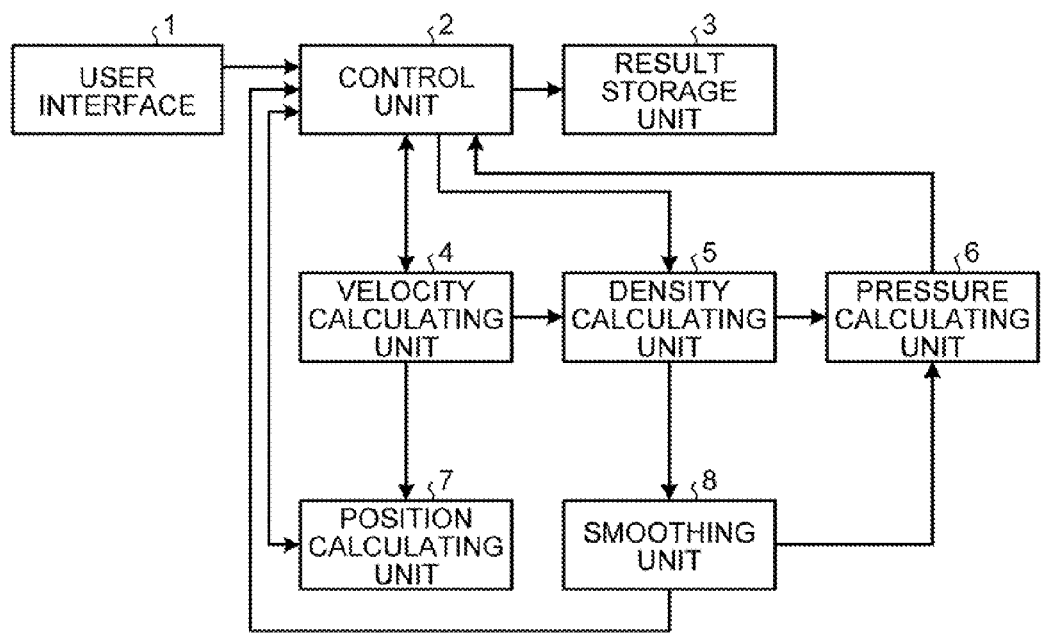
FIG. 1 is a block diagram of a simulation apparatus according to an embodiment.

FIG. 1 is a block diagram of a simulation apparatus according to an embodiment. As illustrated in FIG. 1, the simulation apparatus according to the embodiment includes a user interface 1, a control unit 2, a result storage unit 3, a velocity calculating unit 4, a density calculating unit 5, a pressure calculating unit 6, a position calculating unit 7, and a smoothing unit 8. The user interface 1 is an interface device that receives values input by a user using the simulation apparatus and outputs a simulation result to the user. More specifically, the user interface 1 is an input device, such as a keyboard, and an output device, such as a display device.

The control unit 2 receives input of the mass, the velocity, the density, the pressure, and the position of each particle in the initial state, i.e., input of the mass and the initial values of the velocity, the density, the pressure, and the position of each particle, from the user interface 1. The control unit 2 outputs the received mass and the received initial values of the velocity, the density, the pressure, and the position of each particle to the velocity calculating unit 4. The control unit 2 also outputs the received mass and the received initial value of the density of each particle to the density calculating unit 5. The control unit 2 also outputs the received initial value of the pressure of each particle to the pressure calculating unit 6. The control unit 2 also outputs the received mass of each particle to the smoothing unit 8. The control unit 2 also outputs the received initial value of the position of each particle to the position calculating unit 7.

The control unit 2 also receives a specified timing of termination of a simulation from the user interface 1. In the embodiment, the timing of termination of a simulation is specified in units of steps, and it is assumed that the timing is specified such that the simulation ends after L steps. In the embodiment, one step indicates the state after a lapse of $\Delta t$ time. That is, the state after n steps ($1 \leq n \leq L$) indicates the state after a lapse of $n\Delta t$ time. In the following, the initial state is described as the first step and a step at the end of n steps is described as "step n". In other words, the initial state indicates a step that is performed for the first time. In the following explanation, the latest step at which calculations of physical quantities are complete is described as a step n and a subsequent step at which the physical quantities are to be calculated next is described as a step n+1.

In the embodiment, the timing of termination is specified in units of steps; however, other methods may be applied. For example, it may be possible to specify a time from the initial state to the termination.

The control unit 2 generates a list of other particles that are present in an influence area of each particle, on the basis of the initial value of the position of each particle received from the user interface 1. In the following, the other particles in the influence area of each particle are described as "neighboring particles", and the list of the neighboring particles is described as a "neighboring particle list".

Figure 2:
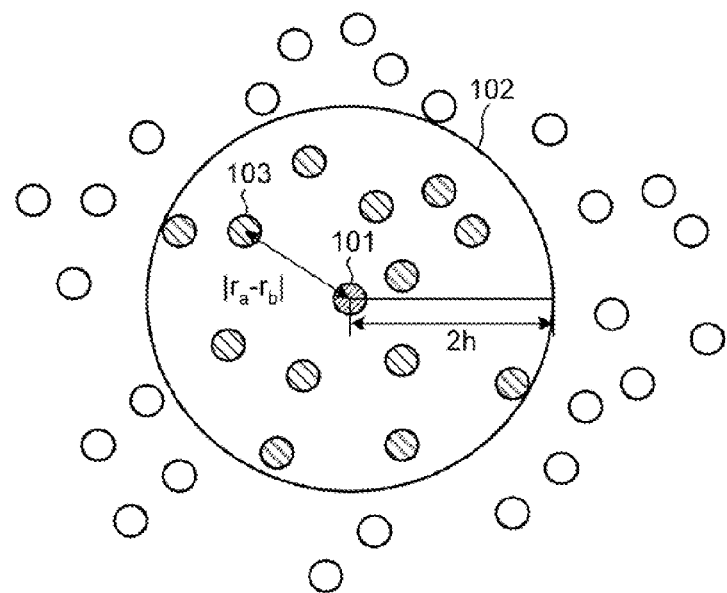
FIG. 2 is a diagram for explaining an influence area and neighboring particles.

FIG. 2 is a diagram for explaining the influence area and the neighboring particles. The influence area and the neighboring particles of each particle will be explained with reference to FIG. 2. In the following explanation, it is assumed that a particle of interest and the other particles influence each other when the distance therebetween is 2h or shorter. The influence means that, for example, a force is applied to the other particles when a particle moves.

In the following, a particle 101 in FIG. 2 is explained as an example. An influence area 102 of the particle 101 is an area encompassed by a circle of radius 2h with the center located at the particle 101. The radius 2h is a radius of influence of the particle 101. Other particles contained in the influence area 102 are the neighboring particles of the particle 101. In FIG. 2, particles marked with diagonal lines as represented by a particle 103 for example are the neighboring particles. Specifically, the neighboring particles marked with the diagonal lines are the other particles to be influenced by the particle 101. Conversely, the particle 101 is influenced only by the neighboring particles marked with the diagonal lines. It is empirically known that if the radius 2h is set so as to contain several tens of neighboring particles in the area, it becomes possible to sufficiently analyze interactions between the particle of interest and the other particles.

Assuming that a position vector representing the position of the particle 101 is denoted by ra and a position vector representing the position of the particle 103 is denoted by rb, a distance between the particle 101 and the particle 103 is represented as |ra−rb|. When |ra−rb|≤2h is satisfied, the particle 103 functions as the neighboring particle of the particle 101.

For example, when generating a neighboring list of the particle 101 in FIG. 2, the control unit 2 extracts particles in the influence area 102, such as the particle 103, as the neighboring particles of the particle 101. For example, the control unit 2 calculates a distance from the particle 101 being the particle of interest to each of the other particles on the basis of the position of the particle 101 and the positions of the other particles, and extracts particles that are present within the distance 2h as the neighboring particles.

Referring back to FIG. 1, the control unit 2 extracts the neighboring particles of each of the particles. The control unit 2 generates a neighboring particle list, in which each particle of interest is associated with the extracted neighboring particles of the particle of interest. The control unit 2 outputs the generated neighboring particle list to the velocity calculating unit 4, the density calculating unit 5, the pressure calculating unit 6, the position calculating unit 7, and the smoothing unit 8.

The control unit 2 receives input of the velocity of each particle of interest in the step n+1 from the velocity calculating unit 4. The control unit 2 also receives input of the density and the pressure of each particle of interest in the step n+1 from the smoothing unit 8. The control unit 2 also receives input of the position of each particle of interest in the step n+1 from the position calculating unit 7. As described above, one step indicates the state after a lapse of Δt time. Therefore, for example, the velocity in the step n+1 is the velocity that is changed from the velocity in the step n over Δt time.

Specifically, the control unit 2 receives input of the velocity, the density, the pressure, and the position of each particle of interest after a lapse of Δt time from the initial state. Subsequently, the control unit 2 receives input of the velocity, the density, the pressure, and the position of each particle of interest after a lapse of 2Δt time from the initial state. In this manner, if the control unit 2 has received the velocity, the density, the pressure, and the position in the step n, the control unit 2 receives the velocity, the density, the pressure, and the position of each particle of interest in the subsequent step n+1. The control unit 2 sequentially receives the velocity, the density, the pressure, and the position of each particle of interest in subsequent steps until the specified time to terminate the simulation comes.

When the control unit 2 receives input of information on a step that is one step after the step n+1 where the latest velocity, density, pressure, and position of each particle of interest have received, the control unit 2 stores the received information on the step n+1 in the result storage unit 3.

The control unit 2 outputs the density, the pressure, and the position of each particle of interest in the step n+1 to the velocity calculating unit 4 as the density, the pressure, and the position of each particle of interest to be used in the next calculation.

The control unit 2 also outputs the density of each particle of interest in the step n+1 to the density calculating unit 5 as the density to be used in the next calculation.

The control unit 2 also outputs the pressure of each particle of interest in the step n+1 to the pressure calculating unit 6 as a current pressure to be used in the next calculation.

The control unit 2 also outputs the velocity of each particle of interest in the step n+1 to the position calculating unit 7.

The control unit 2 obtains the neighboring particles of each particle of interest in the step n+1 by using the received position of each particle of interest in the step n+1, and generates the neighboring particle list. Then, the control unit 2 outputs the generated neighboring particle list to the velocity calculating unit 4, the density calculating unit 5, the pressure calculating unit 6, the position calculating unit 7, and the smoothing unit 8. In this way, the control unit 2 outputs the velocity, the density, the pressure, the position, and the neighboring particle list to a corresponding unit at each step. The control unit 2 then gives instructions to the velocity calculating unit 4, the density calculating unit 5, the pressure calculating unit 6, the position calculating unit 7, and the smoothing unit 8 to calculate data for a next step by using the current data, and causes each unit to repeat the calculation.

The result storage unit 3 is a storage device, such as a memory or a hard disk.

The velocity calculating unit 4 stores therein, for example, a quintic spline function represented by the following Equation (1), as a kernel function.

$$W(r, h) = \begin{cases} \alpha_D \left(1 - \frac{q}{2}\right)^4 (2q + 1) & (0 \le q \le 2) \\ 0 & (\text{otherwise}) \end{cases} \quad (1)$$

Here, $\alpha D$ is a value that is given by $\alpha D = 7/(4\pi h^2)$ in the two-dimensional calculation and by $\alpha D = 21/(16\pi h^3)$ in the three-dimensional calculation. r is a distance between two particles used in the calculation with the kernel function, h is the influence area, and q is defined as q=r/h.

Equation (1) represents the degree of contribution to the influence on the other particles. Specifically, Equation (1) indicates that the degree of contribution of one particle to the influence on the other particles becomes smaller with an increase in a distance between the particles.

Furthermore, Equation (1) satisfies the following three conditions: (a) a value of integral performed over all space is 1; (b) when the influence area approaches zero, the limit is given by the Dirac delta function; and (c) the first (at least) order differential is possible.

Moreover, in Equation (1), a value of zero is obtained when q is smaller than zero or when q is greater than 2; therefore, it has the property that the value becomes zero outside the finite domain. This property may be referred to as a compact support.

In the compression field, when $d^2W/dq^2$ is in the negative domain, a numerical instability called a tensile instability is likely to occur. Therefore, it is particularly preferable to use the quintic spline function represented by Equation (1) as the kernel function because, with this function, a domain where $d^2W/dq^2$ becomes negative is relatively narrow and instability is less likely to occur. However, other kernel functions may be used in accordance with a request for reduction of the numerical instability. Examples of the other kernel functions include functions represented by the following Equations (2) to (4).

$$W(r,h) = \alpha_D \exp(-q^2) \quad (2)$$

Here, q=r/h, $\alpha D$ is a value that is given by $\alpha D = 1/(\pi h^2)$ in the two-dimensional calculation and by $\alpha D = 1/(\pi^{3/2} h^3)$ in the three-dimensional calculation. Equation (2) is a Gaussian function.

$$W(r, h) = \begin{cases} \alpha_D \left(\frac{3}{16} q^2 - \frac{3}{4} q + \frac{3}{4}\right) & (0 \le q \le 2) \\ 0 & (\text{othewise}) \end{cases} \quad (3)$$

Here, $\alpha D$ is a value that is given by $\alpha D = 2/(\pi h^2)$ in the two-dimensional calculation and by $\alpha D = 5/(4\pi h^3)$ in the three-dimensional calculation.

$$W(r, h) = \alpha_D \begin{cases} 1 - \frac{3}{2}q^2 + \frac{3}{4}q^3 & (0 \le q \le 1) \\ \frac{1}{4}(2-q)^3 & (0 \le q \le 2) \\ 0 & (\text{otherwise}) \end{cases} \quad (4)$$

Here, $\alpha D$ is a value that is given by $\alpha D = 10/(7\pi h^2)$ in the two-dimensional calculation and by $\alpha D = 1/(\pi h^3)$ in the three-dimensional calculation.

Each of Equations (2) to (4) represents the degree of contribution of a certain particle to the influence on the other particles. Furthermore, each of Equations (2) to (4) indicates that the degree of contribution of one particle to the influence on the other particle becomes smaller with an increase in a distance between the particles. Moreover, each of Equations (2) to (4) satisfies the above conditions (a), (b), and (c).

In particular, the Gaussian function given by Equation (2) represents the degree of contribution of one particle to the influence on the other particle by a normal distribution. When Equation (2) is used, mathematically-rigid values are obtained in calculations of the velocity, the density, the pressure, and the position as will be described below. However, with use of Equation (2), a point represented by $W(r, h) = 0$ is not obtainable. In this case, the influence area becomes ambiguous and it becomes unclear what value needs to be taken as the radius of influence. Therefore, in the present embodiment, Equation (1) is used as the kernel function in consideration of the balance against the accuracy.

The velocity calculating unit 4 also stores therein the following Equation (5) as a discretized equation of motion that represents the acceleration of a particle.

$$\frac{dv_a}{dt} = -\sum_b m_b \left( \frac{p_b + p_a}{\rho_b \rho_a} \right) \nabla_a W_{ab} - \sum_b m_b \left( \frac{\beta_{av}\phi^2}{\rho_{ab}} \right) \nabla_a W_{ab} + g \quad (5)$$

A subscript a indicates information on a particle a, and a subscript b indicates information on a particle b (in the following, the subscripts a and b are used in the same manner). That is, the equation of motion given by Equation (5) represents the acceleration of the particle a. Here, the particle a is a particle that is arbitrarily extracted from the all particles. The particle b is a neighboring particle of the particle a. Therefore, a range of the sum covers the neighboring pixels of the particle a. $\rho_a$ is the density of the particle a, and $\rho_b$ is the density of the particle b. $\rho_{ab}$ (a crossbar symbol above $\rho_{ab}$ is not described here) represents an arithmetic average of $\rho_a$ and $\rho_b$. $p_a$ is the pressure applied to the particle a, and $p_b$ is the pressure applied to the particle b. $W_{ab}$ is a kernel function with the particle a and the particle b, which is represented by Equation (1) in the embodiment. $\nabla_a$ represents a vector differential operator at the position of the particle a. $m_b$ is the mass of the particle b. A term g (where g represents a vector) represents an external force term.

The first term in the right-hand side of Equation (5) represents a pressure gradient. The second term in the right-hand side of Equation (5) represents an artificial viscosity. The third term in the right-hand side of Equation (5) represents the gravity.

The artificial viscosity term as the second term in the right-hand side of Equation (5) is provided to exert a force in such a direction that the particles are prevented from colliding with each other only when the particle a and the particle b approach each other. $\beta_{av}$ in the artificial viscosity term is a parameter for adjusting the degree of the artificial viscosity. $\Phi$ in the artificial viscosity term is represented by the following Equation (6).

$$\phi = \begin{cases} \frac{hr_{ba} \cdot v_{ba}}{r_{ba}^2 + \eta^2} & (r_{ba} \cdot v_{ba} < 0) \\ 0 & (r_{ba} \cdot v_{ba} \ge 0) \end{cases} \quad (6)$$

Here, $r_{ba} = (r_b - r_a)$ (where $r_{ba}$, $r_b$, and $r_a$ represent vectors), and $r_a$ and $r_b$ represent the position vectors of the particle a and the particle b, respectively. That is, $r_{ba}$ is a distance between the particle a and the particle b. $v_{ba} = (v_b - v_a)$ (where $v_{ba}$, $v_b$, and $v_a$ represent vectors). $\eta$ is a parameter for preventing divergence of the denominator.

An explanation is given of the derivation of Equation (5). The equation of fluid motion is represented by the following Equation (7).

$$\frac{dv}{dt} = -\frac{1}{\rho}\nabla p - \frac{\mu}{\rho}\Delta v + g \quad (7)$$

Here, v (where v is a vector) represents a velocity vector, $\rho$ represents the density of fluid, p represents the pressure of fluid, and the term g (where g represents a vector) represents an external force term. $\Delta$ represents a Laplace operator. The first term in the right-hand side of Equation (7) represents a pressure gradient, the second term represents a force due to the viscous stress, and the third term represents an external force.

$-\nabla P/\rho$ representing the pressure gradient indicates that the acceleration acts in a direction from where the pressure P is greater to where the pressure P is smaller, and the acceleration decreases as the density $\rho$ increases. Furthermore, $\nabla P/\rho$ can be transformed as represented by the following Equation (8).

$$\frac{\nabla P}{\rho} = \frac{P}{\rho^\sigma}\nabla\left(\frac{1}{\rho^{1-\sigma}}\right) + \frac{1}{\rho^{2-\sigma}}\nabla\left(\frac{P}{\rho^{1-\sigma}}\right) \quad (8)$$

In Equation (8), $\sigma$ is an adjustment parameter for generalizing cases that symmetrization is performed for each particle when discretization is performed with the particle method against Equation (7) as explained below.

The pressure gradient given by Equation (7) is transformed by using Equation (8), and thereafter discretized by using the SPH method. In the SPH method, the physical quantity A of the particle a is represented in a discretized manner as represented by the following Equation (9). Examples of the physical quantity A include pressure and density.

$$A_a = \sum_b \frac{m_b}{\rho_b} A_b W_{ab} \quad (9)$$

When the pressure gradient given by Equation (7) is transformed by using Equation (8), and thereafter discretized by using Equation (9), the following Equation (10) is obtained.

$$\frac{dv_a}{dt} = -\sum_b m_b \left( \frac{p_b}{\rho_a^{2-\sigma}\rho_b^\sigma} + \frac{p_a}{\rho_a^\sigma \rho_b^{2-\sigma}} \right) \nabla_a W_{ab} - \sum_b m_b \left( \frac{\beta_{av}\phi^2}{\rho_{ab}} \right) \nabla_a W_{ab} + g \quad (10)$$

In Equation (10), the viscous stress term given in Equation (7) is omitted. This is because the viscous stress of fluid with low viscosity, such as a wave, which is a target of analysis in the present embodiment, is small enough to be neglected; therefore, the viscous stress is omitted from the equation obtained after the discretization. As can be seen from Equation (10), the equation of motion is represented by a symmetrical expression with respect to each of the particle a and the particle b. Specifically, interactive forces between the particle a and the particle b become the same. Therefore, in the analysis using Equation (10), it becomes easy to maintain the conservation law of momentum and the conservation law of energy.

When the adjustment parameter is set such that σ=1, a result of Equation (5) is obtained. In the present embodiment, the adjustment parameter is set such that σ=1; however, σ may take other values. For example, it may be possible to set such that σ=0 as generally applied in the conventional particle method.

Furthermore, as will be explained below, the Symplectic Euler method is used to perform time integration in the present embodiment because this method is less likely to cause energy dissipation. In the Symplectic Euler method, the equation of motion is written as a Hamilton equation represented by the following Equations (11) and (12).

$$\frac{de_a}{dt} = -\nabla_r H(e_a \cdot r_a) \tag{11}$$

$$\frac{dr_a}{dt} = \nabla_e H(e_a \cdot r_a) \tag{12}$$

Here, $e_a = m_a v_a$ (where $e_a$ represents a vector) is a momentum vector of the particle a. $\nabla_r$ is a differential operator related to the position, and $\nabla_e$ is a differential operator related to the momentum. H is the whole energy (Hamiltonian).

The Symplectic Euler method is a scheme for performing time integration against a system written in the Hamilton equation, and executed at steps represented by the following Equations (13) and (14).

$$e_a^{n+1} = e_a^n - \Delta t \nabla_r H(e_a^{n+1}, r_a^n) \tag{13}$$

$$r_a^{n+1} = r_a^n + \Delta t \nabla_e H(e_a^{n+1}, r_a^n) \tag{14}$$

Here, a superscript n represents the number of time steps and $\Delta t$ represents a time increment. Each of Equations (13) and (14) includes values of the step n+1 in the both sides; therefore, they are implicit formulas. However, if Hamiltonian is represented by the sum of a term that depends on only e or a term that depends on only r, i.e. H(e, r)=T(e)+U(r), Equation (13) can be represented by the following Equation (15), and Equation (14) can be represented by the following Equation (16).

$$e_a^{n+1} = e_a^n - \Delta t \nabla_r U(r_a^n) \tag{15}$$

$$r_a^{n+1} = r_a^n + \Delta t \nabla_e T(e_a^{n+1}) \tag{16}$$

Equations (15) and (16) do not include an unknown value in the right-hand sides; therefore, they can be solved explicitly.

If the above is applied to the particle method, Hamiltonian can be defined by the following Equation (17).

$$H = \frac{1}{2}\sum_{a=1}^{N} \frac{1}{m_a} e_a^T e_a + \sum_{a=1}^{N-1} \sum_{b=a+1}^{N} m_a m_b \left(\frac{p_a + p_b}{\rho_a \rho_b}\right) W_{ab} + \sum_a G_a \tag{17}$$

Here, N is the total number of particles. The first term of Equation (17) represents kinetic energy, the second term represents interparticle potential, and the third term represents external force potential. Here, $\nabla G_a = g$ (where g represents a vector).

With the definition given by Equation (17), the equation of motion given by Equation (5) can be obtained from Equation (12). Furthermore, $dr_a/dt = v_a$ is obtained from Equation (13). Therefore, it can be ensured that Equation (5) forms the Hamilton system and it can be seen that Equation (5) is appropriate as the equation of motion using the Symplectic method.

Conventionally, the following Equation (18) for example has been used as the equation of motion.

$$\frac{dv_a}{dt} = -\sum_b m_b \left(\frac{p_b}{\rho_b^2} + \frac{p_a}{\rho_a^2} + \Pi_{ab}\right) \nabla_a W_{ab} + g \tag{18}$$

Here, $\Pi_{ab}$ is a viscosity term representing the viscous stress, and is represented by the following Equation (19).

$$\Pi_{ab} = -\frac{\xi}{\rho_a \rho_b} \rho_a \rho_b \frac{4\mu_a \mu_b}{\mu_a + \mu_b} \frac{v_{ab} \cdot r_{ab}}{r_{ab}^2 + \eta^2} + \frac{\beta_{av} \phi^2}{\rho_{ab}} \tag{19}$$

Here, μ is a viscosity coefficient, and is given by $\mu = 10^{-3}$ (Pa·s) in the case of water. ξ is a parameter for adjusting the physical viscosity and is, for example, ξ=4.96333. The second term in the right-hand side of Equation (19) is an artificial viscosity term provided to correct a numerical error due to discontinuity of a physical quantity.

When a simulation is performed by using the equation of motion represented by Equation (18), greater wave-height attenuation than reality occurs.

By contrast, the equation of motion obtained by eliminating the artificial viscosity from Equation (5) that is the equation of motion of the embodiment is derived from the conservation law of energy represented by the Hamilton equation. Specifically, the equation of motion given by Equation (5) can adequately reflect the conservation law of energy and the conservation law of momentum, so that it is possible to reduce wave-height attenuation or the like. Therefore, in the analysis using Equation (5) that is the equation of motion of the embodiment, it becomes possible to more appropriately perform an analysis of, for example, wave propagation that needs the stability, compared with the analysis using the conventional equation as given by Equation (18).

Referring back to FIG. 1, the explanation of the velocity calculating unit 4 is continued. The velocity calculating unit 4 calculates acceleration dv/dt by using the equation of motion (5).

Subsequently, the velocity calculating unit 4 calculates a repulsive force from the boundary by using the following Equation (20).

$$\frac{dv_n}{dt} = -\frac{(\beta c_0)^2}{d^2} s \qquad (20)$$

Figure 3:
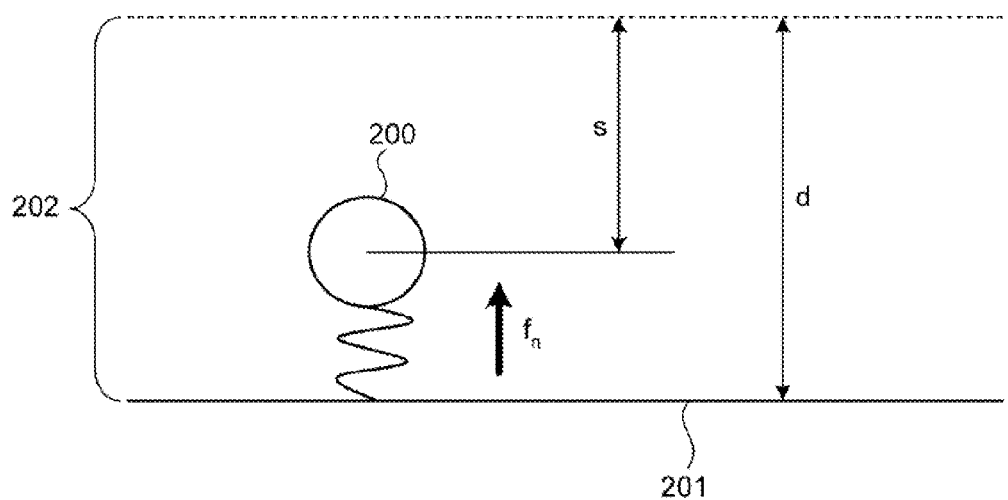
FIG. 3 is a diagram for explaining a repulsive force from a boundary used in the embodiment.

With reference to FIG. 3, an explanation is given of Equation (20). FIG. 3 is a diagram for explaining a repulsive force from a boundary used in the embodiment. In the following, a repulsive force applied to a particle 200 from a boundary in FIG. 3 is explained.

As illustrated in FIG. 3, d denotes a predetermined distance from a boundary surface 201. A boundary layer 202 is a layer with a width d from the boundary surface. s denotes an invasion distance of the particle 200 in the boundary layer 202.

In the embodiment, it is assumed that the boundary layer 202 with the width d from the boundary surface 201 is provided and if the particle 200 invades the boundary layer 202, repulsive acceleration in a direction toward the particle 200 is applied to the particle 200 from the boundary surface 201. A repulsive force f, is given as $f_n = ks$, which is the same form as that of an elastic spring. A spring stiffness coefficient k is set so that kinetic energy of a particle at a sound speed $c_0$, $mc_0^2/2$, and elastic distortion energy when a particle enters the boundary layer 202 by the length of d, $kd^2/2$, becomes almost the same. Specifically, because it is considered that the speed of the particle 200 does not exceed the sound speed in a simulation for analysis of the motion of a continuum, if it is set so that there is little energy at the boundary surface 201 when the particle 200 enters the boundary layer at the sound speed, it is possible to prevent the particle 200 from penetrating through the boundary surface. Therefore, a parameter β is set to about 1. With β set as above, Equation (20) is obtained.

With use of the repulsive force represented by Equation (20), it becomes possible to prevent particles from penetrating through a boundary wall, improve the accuracy of a frictional condition or a free slip condition to be applied, and prevent physically meaningless energy consumption at the boundary. Furthermore, because Equation (20) is simple, it is possible to reduce calculation loads by using the repulsive force represented by Equation (20).

In the embodiment, Equation (20) is used as an equation that can prevent various disadvantages including occurrence of greater wave-height attenuation than reality; however, the repulsive force may be obtained by using other equations. For example, considering that the repulsive force may become excessive, it may be possible to set the repulsive force so as to take an elastic spring into consideration when a particle approaches the boundary surface and so as not to take the elastic spring into consideration when the particle goes away from the boundary surface. Such repulsive force may be referred to as one-way elastic spring method. From a viewpoint of the conservation of energy, it is preferable to use the repulsive force as represented by Equation (20), in which an elastic spring is taken into consideration regardless of relative velocity between the particle and the boundary surface. However, it may be possible to use the one-way elastic spring method in order to avoid unnatural repulsion at the boundary.

The velocity calculating unit 4 calculates acceleration $F''_a$ (where $F''_a$ represents an acceleration vector) for the step n by adding the acceleration dv/dt calculated by using the equation of motion (5) and the repulsive force calculated by using Equation (20).

Subsequently, the velocity calculating unit 4 performs time integration represented by the following Equation (21) by using the calculated acceleration $F''_a$, to thereby obtain the velocity for the step n+1.

$$v_a^{n+1} = v_a^n + \Delta t F_a^n \qquad (21)$$

Here, $v^n$ represents the velocity in the step n.

In the embodiment, a time increment $\Delta t$ is given by the following Equation (22). In the following explanation, all time increments $\Delta t$ are given by the following Equation (22).

$$\Delta t = \alpha_{\Delta t} \times \min\left(\frac{h}{c_0}, \sqrt{\frac{h}{g}}\right) \qquad (22)$$

Here, $\alpha_{\Delta t}$ is a coefficient for preventing divergence, and is set to 0.1 by way of example in the embodiment.

The velocity calculating unit 4 performs the above-explained process for all of the particles, in which the acceleration in the step n is calculated by adding the acceleration calculated with the equation of motion and the repulsive force from the boundary surface and then the velocity in the step n+1 is calculated by using the acceleration in the step n.

The velocity calculating unit 4 outputs the calculated acceleration of each particle in the step n+1 to the control unit 2, the density calculating unit 5, and the position calculating unit 7.

The density calculating unit 5 stores therein the kernel function represented by Equation (1). The density calculating unit 5 also stores therein a discretized continuity equation that represents a temporal change in the density of a particle, as represented by the following Equation (23).

$$\frac{d\rho_a}{dt} = \sum_b m_b (v_a - v_b) \nabla_a W_{ab} \qquad (23)$$

An explanation is given of the derivation of Equation (23). A non-discretized continuity equation of a temporal change of the density is represented by the following Equation (24).

$$\frac{d\rho}{dt} = -\rho \nabla \cdot v \qquad (24)$$

By discretizing Equation (24) by using the physical quantity A of the particle a that is used in the SPH method as represented by the above Equation (9), Equation (23) is obtained. This continuity equation is obtained as superposition of the density of each particle represented by a weight kernel function, where the mass of each particle is used as a weight.

Referring back to FIG. 1, the density calculating unit 5 receives input of the mass of each particle, the position of each particle in the step n, and the neighboring particle list in the step n from the control unit 2. The density calculating unit 5 also receives the velocity in the step n+1 from the velocity calculating unit 4. The density calculating unit 5 substitutes the mass of each particle, the velocity of each particle in the step n+1, the position of each particle in the step n, and the neighboring particle list in the step n, which are all received, into Equation (23). Then, the density calculating unit 5 calculates a density time differential in the step n+1 $d\rho_a/dt = D_a^{n+1}$.

Subsequently, the density calculating unit 5 performs time integration represented by the following Equation (25) by using the density in the step n, which is calculated at the previous step, and by using the calculated density time differential in the step n+1, to thereby obtain the density in the step n+1.

$$\rho_a^{n+1} = \rho_a^n \Delta t D_a^{n+1} \quad (25)$$

The density calculating unit 5 calculates a density time differential and calculates the density by using the density time differential, for all of the particles.

The density calculating unit 5 outputs the calculated density of each particle in the step n+1 to the pressure calculating unit 6 and the smoothing unit 8.

The smoothing unit 8 receives input of the density of each particle in the step n+1 from the density calculating unit 5.

The smoothing unit 8 includes a counter. The smoothing unit 8 counts the number of inputs of the density and the pressure of each particle in the step n+1 by using the counter, and performs the following smoothing on the received density and pressure of all of the particles in the step n+1 once every twenty times (e.g., once every multiples of 20 steps). A step performed once every twenty times is an example of a "predetermined step". In the example, the frequency is set as once every twenty times; however, the frequency may be others or irregular. It is preferable to determine the smoothing step in consideration of the disordered states of the particles at the surface due to the calculation of the density and the pressure.

The smoothing unit 8 performs smoothing of the pressure with respect to the received density in the step n+1, by using the following Equation (26).

$$\rho_a^{new} = \frac{\sum_b m_b W_{ab}}{\sum_b (m_b/\rho_b) W_{ab}} \quad (26)$$

Here, $\rho_a^{new}$ is the density obtained through the smoothing process.

The smoothing unit 8 outputs the density obtained through the smoothing process to the pressure calculating unit 6 as the density in the step n+1. When not performing the smoothing, the smoothing unit 8 outputs, to the control unit 2, the density of each particle in the step n+1 as received from the density calculating unit 5. When performing the smoothing, the smoothing unit 8 outputs, to the control unit 2, the density of each particle in the step n+1 obtained by the smoothing.

As will be described below, the smoothing is performed on the pressure along with the smoothing on the density. As described above, by performing the smoothing on the density and the pressure, it becomes possible to suppress a pressure fluctuation.

In the embodiment, the density of each particle in the step n+1 that is calculated by the density calculating unit 5 is continuously sent to the smoothing unit 8. However, the following method may be employed. For example, the density calculating unit 5 determines whether a current step of execution of the process is the step that is performed once every twenty times, and when the current step of execution of the process is the step that is performed once every twenty times, the density calculating unit 5 outputs the density of each particle in the step n+1 to the smoothing unit 8. Conversely, when the current step of execution of the process is other than the step that is performed once every twenty times, the density calculating unit 5 outputs the density of each particle in the step n+1 to the control unit 2. With this method, it becomes possible to reduce processes performed by the smoothing unit 8.

The pressure calculating unit 6 receives input of the density of each particle in the step n+1 from the density calculating unit 5. The pressure calculating unit 6 also receives input of the smoothed density of each particle in the step n+1 from the smoothing unit 8 at the step that is performed once every twenty times. When receiving the input of the density of each particle in the step n+1 from the smoothing unit 8, the pressure calculating unit 6 updates the density of each particle in the step n+1 that has been received from the density calculating unit 5 with the density of each particle in the step n+1 that is received from the smoothing unit 8.

The pressure calculating unit 6 substitutes the density in the step n+1 into the equation of state represented by the following Equation (27), to thereby calculate the pressure in the step n+1.

$$p = c_0^2 (\rho - \rho_0) \quad (27)$$

Here, $\rho_0$ represents average density. In the embodiment, the calculation is performed with, for example, $\rho_0 = 1$ (g/cm$^3$) and $C_0 = 50$ (m/sec).

With use of the equation of state, the pressure of an area with higher density becomes large and a pressure gradient acts toward the periphery of the area, so that the density irregularity is reduced as a result of using Equation (27). As described above, the density irregularity is reduced and the density becomes almost uniform, so that it becomes possible to improve the accuracy of numerical calculations.

The degree of the density fluctuation represented by $\delta_p = (\rho/\rho_0) - 1$ can be estimated to be equal to or smaller than $v_0^{12}/C_O^2$ that is represented with the typical flow velocity $v_0$ of fluid and the sound speed. The flow velocity in the embodiment is sufficiently smaller than the sound speed (50 m/sec), so that the value of the density fluctuation becomes sufficiently small. In the embodiment, the volume of fluid changes by about 0.1% and the density changes by about 0.1% similarly to the change in the volume; therefore, numerical calculations is not influenced by these values.

The pressure calculating unit 6 calculates the pressure of all of the particles in the step n+1. The pressure calculating unit 6 outputs the calculated pressure of each particle in the step n+1 to the control unit 2.

In the embodiment, the pressure calculating unit 6 continuously receives the density of each particle from the density calculating unit 5, and, when receiving the smoothed density from the smoothing unit 8, the pressure calculating unit 6 updates the density of each particle in the step n+1 with the smoothed value. Alternatively, the following method may be employed. The density calculating unit 5 determines whether a current step of execution of the process is the step that is performed once every twenty times, and when the current step of execution of the process is the step that is performed once every twenty times, the density calculating unit 5 outputs the density of each particle in the step n+1 to only the smoothing unit 8 without outputting the density to the pressure calculating unit 6. Then, the pressure calculating unit 6 receives the density of each particle in the step n+1 from only the smoothing unit 8. Conversely, when the density calculating unit 5 determines that the current step of execution of the process is other than the step that is performed once every twenty times, the density calculating unit 5 outputs the density of each particle in the step n+1 to both of the pressure calculating unit 6 and the smoothing unit 8. Then, the pressure calculating unit 6 receives the density of each particle in the step n+1 from both of the density calculating unit 5 and the smoothing unit 8. With this method, it becomes possible to reduce processes performed by the pressure calculating unit 6.

The position calculating unit 7 receives input of the initial value of the position of each particle from the control unit 2. The position calculating unit 7 also receives input of the velocity of each particle in the step n+1 from the velocity calculating unit 4.

The position calculating unit 7 performs time integration represented by the following Equation (28) by using the received velocity in the step n+1, to thereby obtain the position of a particle in the step n+1.

$$r_a^{n+1} r_a^n + \Delta t v_a^{n+1} \qquad (28)$$

The position calculating unit 7 calculates the positions of all of the particles in the step n+1. Then, the position calculating unit 7 outputs the calculated positions of all of the particles in the step n+1 to the control unit 2.

The time integration method as described above may be referred to as the Symplectic Euler method, in which the velocity for a next step is firstly obtained by time integration, and thereafter, time integration is performed by using the obtained velocity for the next step to calculate the density, the pressure, and the position for the next step. A procedure for performing time integration in a simulation may be referred to as a time integration scheme. The Symplectic Euler method is one of the time integration schemes applied to a system written as the Hamilton equation.

As described above, in the simulation according to the embodiment, time differentiation is performed on the velocity, the velocity for the next step is first obtained and then the density and the pressure for the next step are obtained, and the position for the next step is lastly obtained. Specifically, in the simulation according to the embodiment, both when the density for the step n+1 is obtained and when the position for the step n+1 is obtained, the position for the step n is used. Therefore, it becomes possible to match the timings of calculations of the density and the position. By contrast, in the leap-frog method that has been generally used, the position coordinate is shifted ahead by half a step at the beginning of a calculation, and time integration is subsequently performed while the position coordinate and the velocity are shifted by half a step. In this method, the timings of calculations of the density and the position are deviated from each other. The calculation of the density is largely influenced by the position; therefore, it is preferable to calculate the density and the position at the same timing in order to accurately perform numerical calculations. In other words, if the time differentiation is performed by the Symplectic Euler method used in the embodiment, it becomes possible to accurately ensure the conservation of energy in the numerical calculations.

Figure 4:
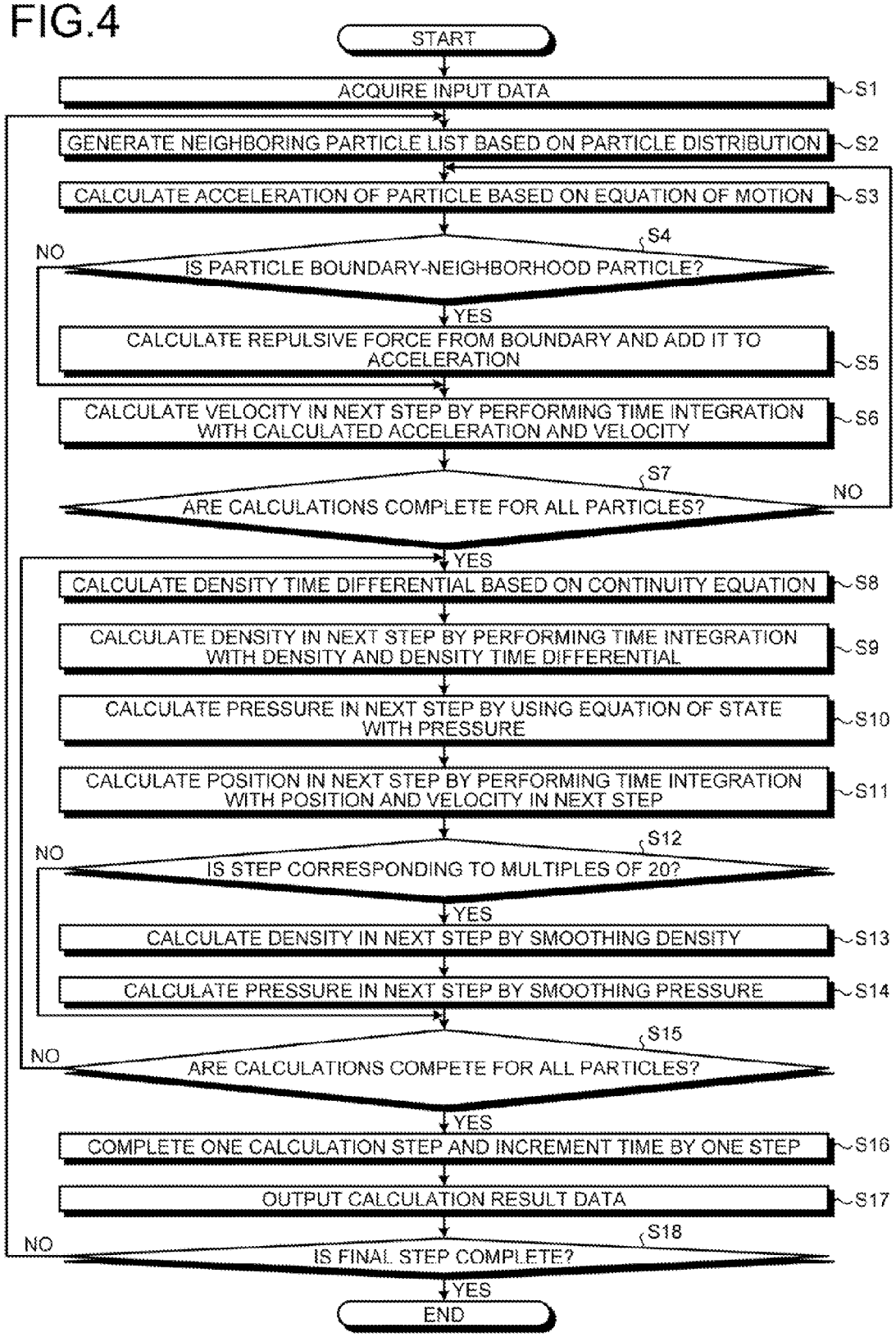
FIG. 4 is a flowchart of a simulation process according to the embodiment.

With reference to FIG. 4, a flow of a simulation process according to the embodiment will be explained. FIG. 4 is a flowchart of the simulation process according to the embodiment. In the following, an exemplary case is explained that the smoothing unit 8 performs smoothing for every multiples of 20 steps, as the step that is performed once every twenty times for execution of the smoothing process.

The control unit 2 acquires input data including the mass of each particle and initial values of the velocity, the density, the pressure, and the position of each particle from the user interface 1 (Step S1). The control unit 2 outputs the received mass and the received initial values of the velocity, the density, the pressure, and the position of each particle to the velocity calculating unit 4. The control unit 2 also outputs the received mass and the received initial value of the density of each particle to the density calculating unit 5. The control unit 2 also outputs the received initial value of the pressure of each particle to the pressure calculating unit 6. The control unit 2 also outputs the received mass of each particle to the smoothing unit 8. The control unit 2 also outputs the received initial value of the position of each particle to the position calculating unit 7.

The control unit 2 generates a neighboring particle list by using the received position of each particle (particle distribution) (Step S2).

The velocity calculating unit 4 calculates the acceleration of a particle in a current step by using the motion of equation given by Equation (5) (Step S3).

The velocity calculating unit 4 determines whether a particle is a boundary-neighborhood particle that is located in a layer near the boundary (Step S4). When the velocity calculating unit 4 determines that the particle is not the boundary-neighborhood particle (NO at Step S4), the process goes to Step S6.

On the other hand, when the particle is the boundary-neighborhood particle (YES at Step S4), the velocity calculating unit 4 calculates a repulsive force from the boundary by using Equation (20). The velocity calculating unit 4 calculates the acceleration of the particle by adding the acceleration in the current step and the repulsive force (Step S5).

The velocity calculating unit 4 calculates the velocity of the particle in a next step by performing time integration given by Equation (21) by using the velocity in the current step and the calculated acceleration in the current step (Step S6).

The control unit 2 determines whether the velocity calculating unit 4 has calculated the velocity of all of the particles in the next step (Step S7). When determining that there is a particle whose velocity in the next step has not been calculated (NO at Step S7), the control unit 2 causes the velocity calculating unit 4 to repeat the processes from Step S3 to Step S6.

On the other hand, when the velocity of all of the particles in the next step has been calculated (YES at Step S7), the density calculating unit 5 calculates a density time differential in the next step by using the continuity equation (Equation (23)) (Step S8). The velocity calculating unit 4 outputs the calculated velocity of each particle in the next step to the control unit 2, the density calculating unit 5, and the position calculating unit 7.

Subsequently, the density calculating unit 5 calculate the density in the next step by performing time integration give by Equation (25) by using the density in the current step and the density time differential in the next step (Step S9). Then, the density calculating unit 5 outputs the calculated density to the pressure calculating unit 6 and the smoothing unit 8.

The pressure calculating unit 6 calculates the pressure in the next step by substituting the density in the next step, which is received from the density calculating unit 5, into the equation of state given by Equation (27) (Step S10).

The position calculating unit 7 calculates the position of the particle in the next step by performing time integration given by Equation (28) by using the velocity in the next step that is received from the velocity calculating unit 4 (Step S11).

The smoothing unit 8 receives input of the density in the next step from the density calculating unit 5. The smoothing unit 8 determines whether the current step is a step corresponding to the multiples of 20 (Step S12). When determining that the current step is not the step corresponding to the multiples of 20 (NO at Step S12), the smoothing unit 8 outputs the density in the next step that is received from the density calculating unit 5 to the control unit 2, and the process goes to Step S15.

On the other hand, when the current step is the step corresponding to the multiples of 20 (YES at Step S12), the smoothing unit 8 performs smoothing by using Equation (26) with the received density in the next step (Step S13). Then, the smoothing unit 8 outputs the smoothed density in the next step to the control unit 2 and the pressure calculating unit 6.

The pressure calculating unit 6 calculates the smoothed pressure in the next step by substituting the smoothed density in the next step that is received from the smoothing unit 8 into the equation of state given by Equation (27) (Step S14). Then, the pressure calculating unit 6 updates the pressure in the next step with the smoothed pressure. Thereafter, the pressure calculating unit 6 outputs the calculated pressure in the next step to the control unit 2.

The control unit 2 determines whether the density calculating unit 5, the pressure calculating unit 6, the position calculating unit 7, and the smoothing unit 8 have calculated the density, the pressure, and the position in the next step for all of the particles (Step S15). When determining that there is a particle whose density, pressure, or position in the next step has not been calculated (NO at Step S15), the control unit 2 causes the density calculating unit 5, the pressure calculating unit 6, the position calculating unit 7, and the smoothing unit 8 to repeat the processes from Step S8 to Step S14.

On the other hand, when the calculations of the density, the pressure, and the position in the next step are complete for all of the particles (YES at Step S15), the control unit 2 terminates the calculations for the current step, and increments time of a calculating object by one step (Step S16).

The control unit 2 outputs a calculation result including the velocity, the density, the pressure, and the position of each particle in the current step to the user interface 1 (Step S17). The control unit 2 stores the result data of the current step in the result storage unit 3.

The control unit 2 determines whether the specified last step is complete (Step S18). When the control unit 2 determines that any of the steps is not complete (NO at Step S18), the process returns to Step S2. On the other hand, when the last step is complete (YES at Step S18), the control unit 2 ends the simulation process.

[Comparison with Hydraulics Model Test]

An explanation is given of a result of comparison with hydraulics model test for examining the accuracy of the simulation according to the embodiment.

Figure 5:
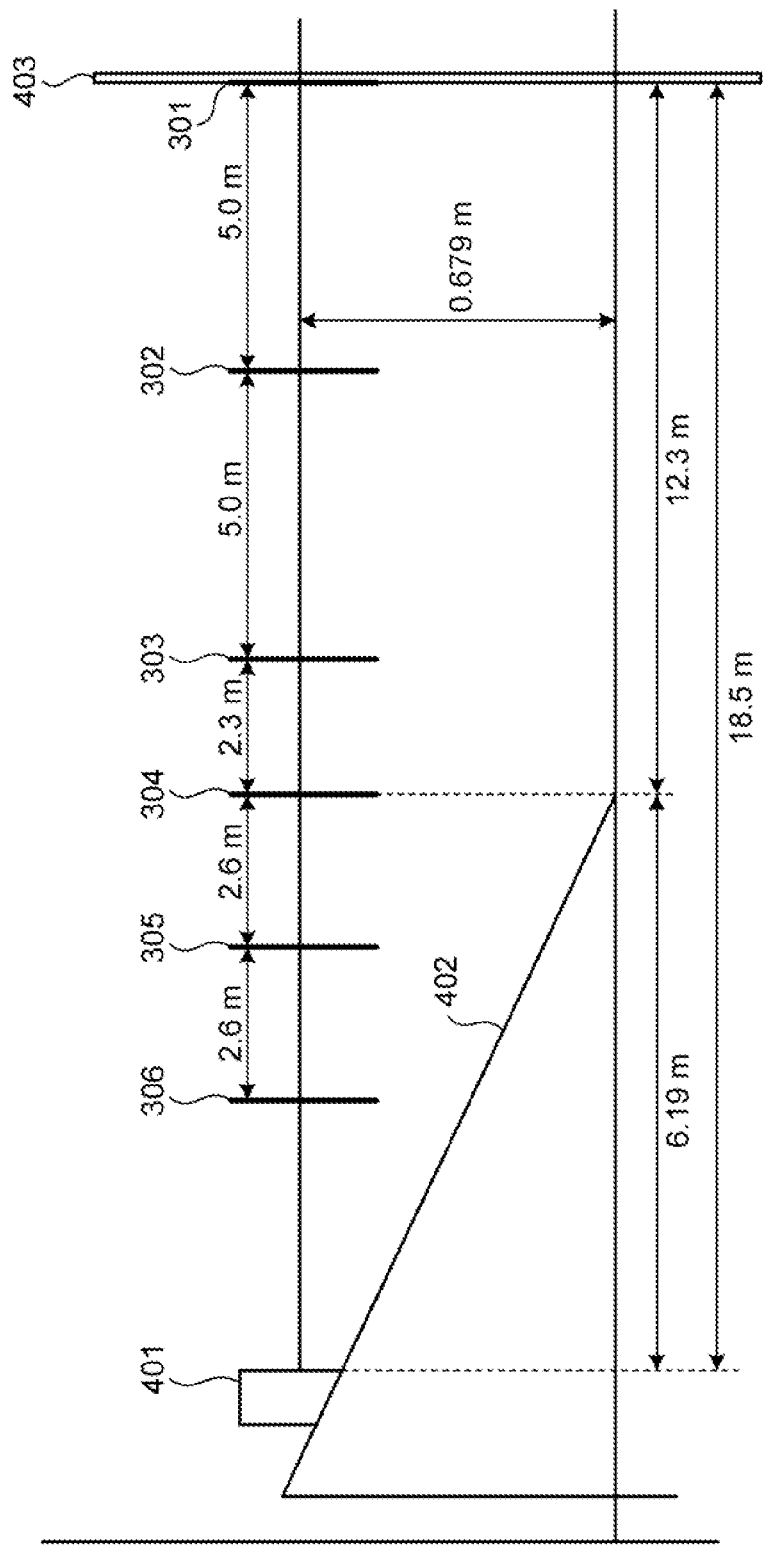
FIG. 5 is a conceptual diagram of a wave generation tank used in a hydraulics model test.

FIG. 5 is a conceptual diagram of a wave generation tank used in a hydraulics model test. In the hydraulics model test, wave-height meters 301 to 306 are provided at the positions illustrated in FIG. 5 to obtain records of wave heights.

A revetment 401 in FIG. 5 is a simulated breakwater, and a slope 402 is a simulated slope that is inclined from a simulated bottom to the revetment 401. A wave generation board 403 is caused to perform amplitude motion to generate waves. A distance from the wave-height meter 301 to the revetment 401 in a water tank is set to 18.5 m and the depth of water is set to 0.679 m. The slope 402 has a gradient of 1/10.

In this test, an analysis was performed by using the above-described simulation method with an analysis model ranging from the wave-height meter 301 to the revetment 401 in the same wave tank as illustrated in FIG. 5, and wave height histories and a wave overtopping rate of the analysis were compared with results of the hydraulics model test that is performed with the water tank illustrated in FIG. 5. The analysis was performed on the assumption that a wave generation board used in the simulation is located at the same position of the wave generation board in the water tank in FIG. 5. To reproduce, by the wave-height meter 306, the wave height histories obtained by the water tank test, movement velocity of the wave generation board 403 is calculated by using the following Equation (29), in which a standing wave term of a conditional equation of non-reflective wave generation is omitted.

$$\frac{dx_{wall}}{dt} = \frac{\omega}{B}(2\eta_D - \eta_0) \quad (29)$$

Here, $\eta_D$ is a target waveform, $\eta_0$ is a water level fluctuation on the front side of the wave generation board, $\omega$ is angular frequency, and $x_{wall}$ is a position coordinate of the wave generation board 403. B satisfies the following Equation (30).

$$B = \frac{2\sinh^2 KH}{KH + \sinh KH \cosh KH} \quad (30)$$

H is a height of a still-water level and K is the number of waves. K can be obtained by the following Equation (31).

$$\frac{\omega^2}{g} = K\tanh KH \quad (31)$$

Here, g is gravitational acceleration.

To examine only the process of surface wave propagation, a hydraulics model test without a revetment, a result of numerical analysis by the simulation according to the embodiment, and a result of numerical analysis by the conventional method were compared with one another. Experimental conditions included a wave height of 20 cm and a cycle of 2 sec. The number of particles in the numerical analysis was 12,1980, an initial particle distance was 1 cm, a radius of influence (=2h) was 3 cm. As the numerical analysis by the conventional method, a method with the following differences from the simulation method of the embodiment was employed. That is, in the numerical analysis by the conventional method, (A) a cubic spline function represented by Equation (4) is used as a kernel function; (B) Equation (18) is used as the equation of motion, where βav=0.1 and η=0.01h in Equation (19); and (C) a leap-frog method is used as a time integration scheme. The leap-frog method is a method in which the position coordinate is shifted ahead by half a step at the beginning of a calculation, and time integration is subsequently performed while the position coordinate and the velocity are shifted by half a step.

Figure 6:
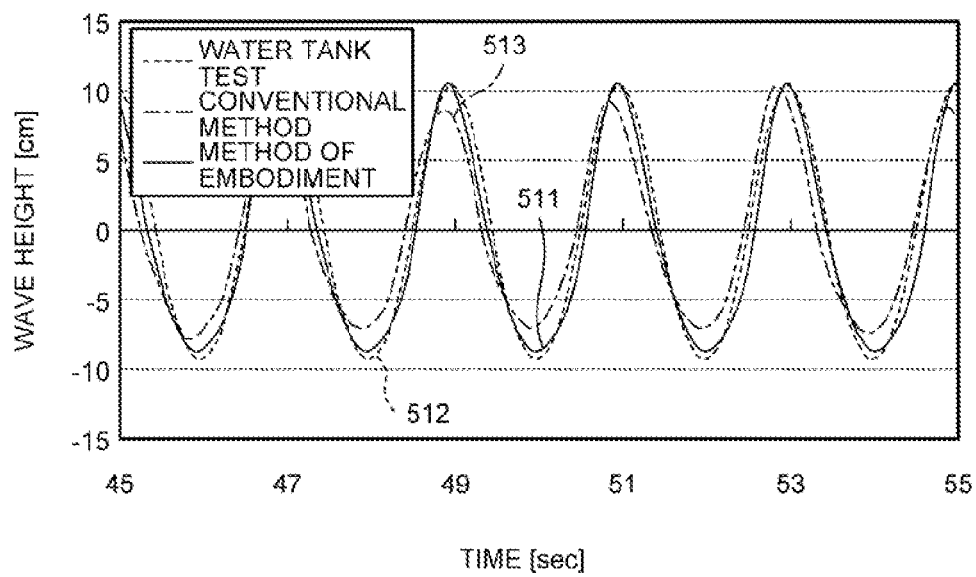
FIG. 6 is a diagram illustrating a comparison between an analysis result and hydraulics model tests of a wave height at a wave-height meter 302.
Figure 7:
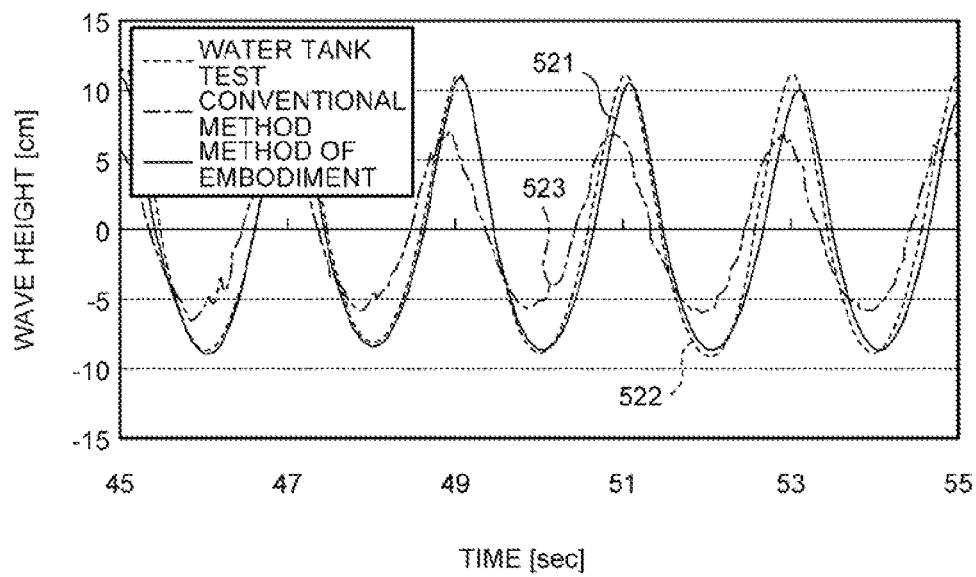
FIG. 7 is a diagram illustrating a comparison between an analysis result and hydraulics model tests of a wave height at a wave-height meter 303.
Figure 8:
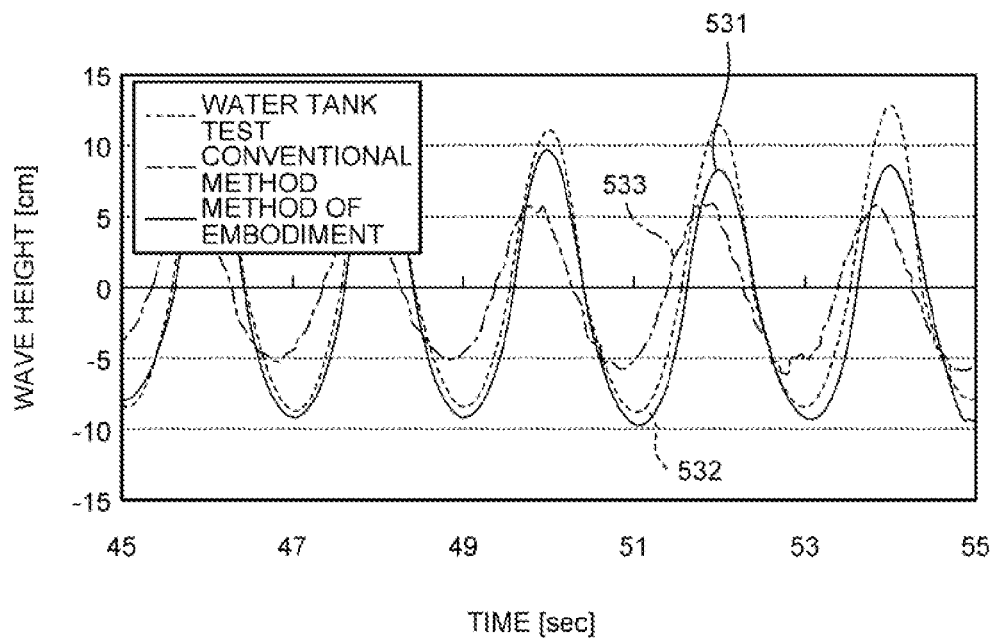
FIG. 8 is a diagram illustrating a comparison between an analysis result and hydraulics model tests of a wave height at a wave-height meter 304.
Figure 9:
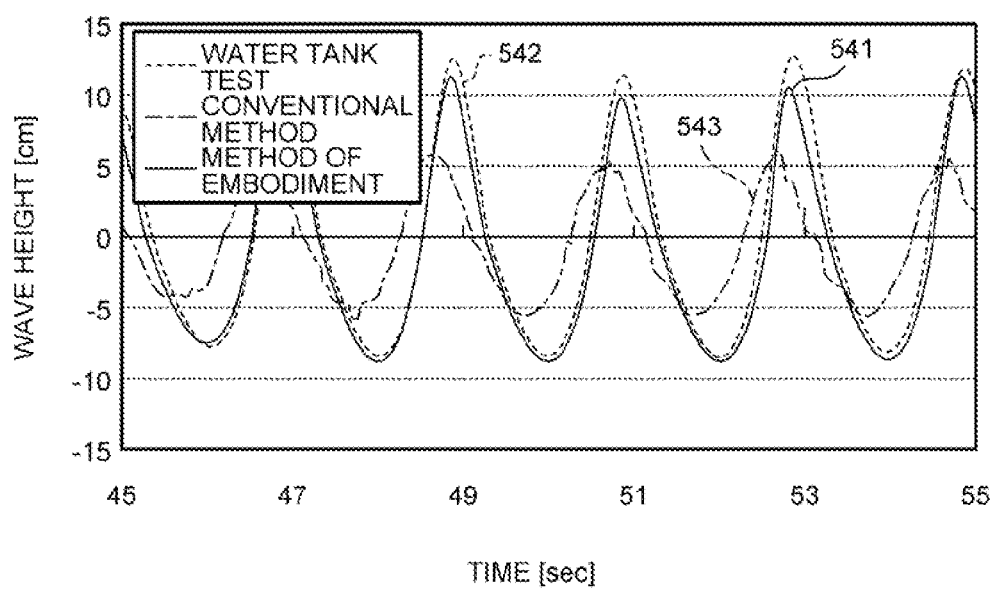
FIG. 9 is a diagram illustrating a comparison between an analysis result and hydraulics model tests of a wave height at a wave-height meter 305.
Figure 10:
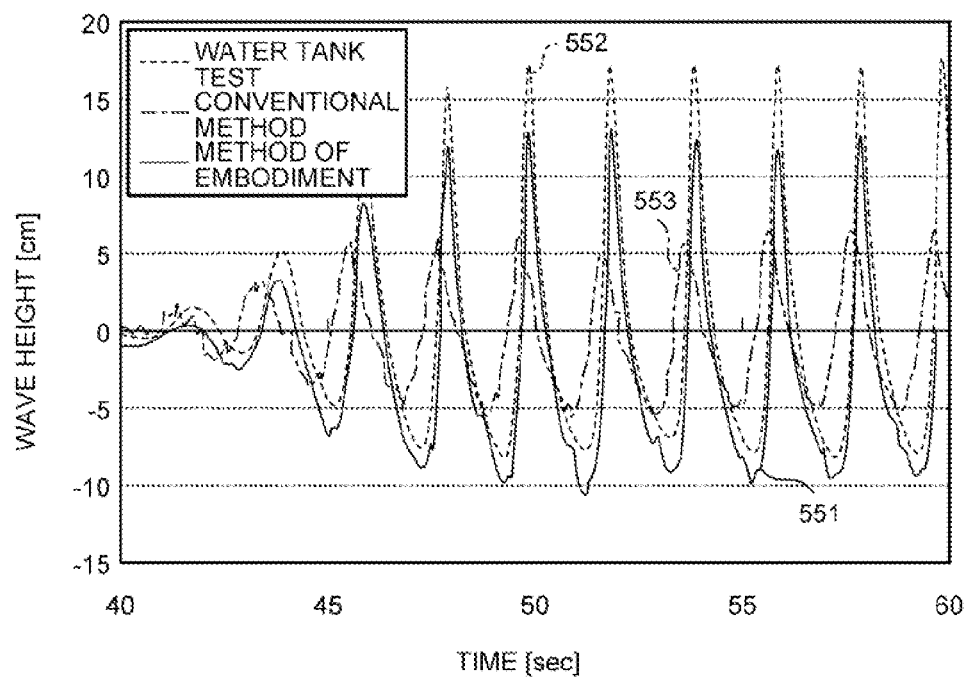
FIG. 10 is a diagram illustrating a comparison between an analysis result and the hydraulics model test of a wave height at a wave-height meter 306.

FIG. 6 is a diagram illustrating a comparison between an analysis result and hydraulics model tests of a wave height at the position of the wave-height meter 302. FIG. 7 is a diagram illustrating a comparison between an analysis result and hydraulics model tests of a wave height at the position of the wave-height meter 303. FIG. 8 is a diagram illustrating a comparison between an analysis result and hydraulics model tests of a wave height at the position of the wave-height meter 304. FIG. 9 is a diagram illustrating a comparison between an analysis result and hydraulics model tests of a wave height at the position of the wave-height meter 305. FIG. 10 is a diagram illustrating a comparison between an analysis result and the hydraulics model test of a wave height at the position of the wave-height meter 306. Graphs of bold lines 511, 521, 531, 541, and 551 in FIG. 6 to FIG. 10 represent the results of the numerical analysis using the simulation method of the embodiment. In FIG. 6 to FIG. 10, the horizontal axis represents time and the vertical axis represents wave height. Graphs of dotted lines 512, 522, 532, 542, and 552 in FIG. 6 to FIG. 10 represent the results of the hydraulics model tests. Graphs of chain lines 513, 523, 533, 543, and 553 in FIG. 6 to FIG. 10 represent the results of the numerical analysis using the conventional method.

As can be seen in FIG. 6 to FIG. 10, the wave height obtained by the conventional method approximately matches the wave height obtained by the hydraulics model test at the wave-height meter 302 located near the wave generation board 403. However, the wave height is largely attenuated as a wave propagation distance increases. At the position of the wave-height meter 306 the wave height obtained by the conventional method is largely deviated from the wave height obtained by the hydraulics model test. For example, although the dotted line 512 and the chain line 513 in FIG. 6 are approximate to each other, the dotted line 552 and the chain line 553 in FIG. 10 are largely deviated from each other.

By contrast, in the numerical analysis using the simulation method of the embodiment, as illustrated in FIG. 6 to FIG. 10, the analysis results approximately match the results of the hydraulics model tests even at the position distant from the wave generation board 403, where the wave propagation distance is long. For example, the dotted line 512 and the bold line 511 in FIG. 6 are approximate to each other and the dotted line 552 and the bold line 551 in FIG. 10 are also approximate to each other. Therefore, the simulation method of the embodiment can obtain a result that is more approximate to the result of the hydraulics model test than those of the conventional method.

Figure 11:
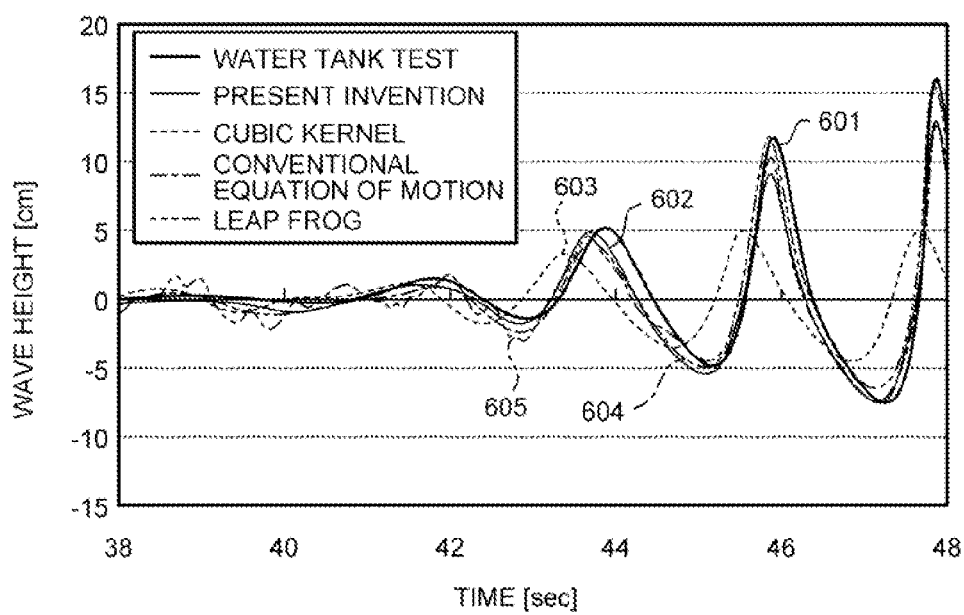
FIG. 11 is a diagram illustrating a wave height obtained when a kernel function, an equation of motion, or a time integration scheme is changed in a simulation method according to the embodiment.

An explanation is given of calculation results obtained by changing the kernel function, the equation of motion, or the time integration scheme to measure the degree of contribution of the kernel function, the equation of motion, or the time integration scheme to the improvement in the accuracy of the numerical calculation. FIG. 11 is a diagram illustrating wave heights obtained when the kernel function, the equation of motion, or the time integration scheme is changed in the simulation method according to the embodiment. In FIG. 11, the kernel function, the equation of motion, or the time integration scheme is switched to (A), (B), or (C) of the conventional method described above. In FIG. 11, the horizontal axis represents time and the vertical axis represents wave height.

Here, a thick bold line 601 indicates a hydraulics model test, a thin bold line 602 indicates the present invention, a dotted line 603 indicates a case that the kernel function is changed, a chain line 604 indicates a case that the equation of motion is changed, and a two-dot chain line 605 indicates a case that the time integration scheme is changed.

As can be seen from FIG. 11, the thick bold line 601 and the thin bold line 602 are the most approximate to each other. When the kernel function, the equation of motion, or the time integration scheme is changed, the result is more deviated from the thick bold line 601 than from the thin bold line 602. Among them, the dotted line 603 indicating a change in the kernel function is the most deviated from the thick bold line 601.

Figures 12, 13:
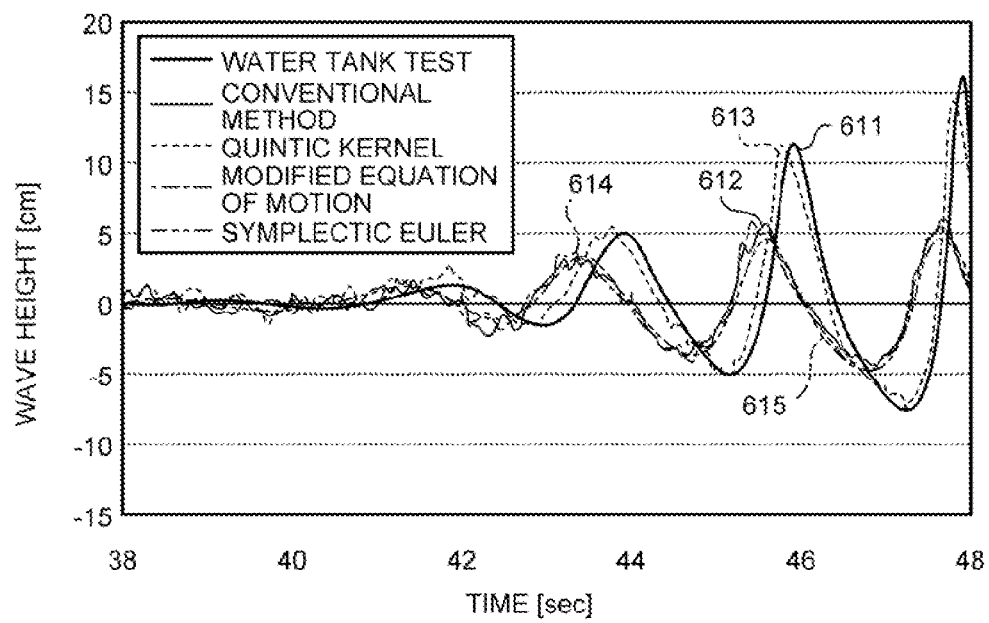
FIG. 12 is a diagram illustrating a wave height obtained when the kernel function, the equation of motion, or the time integration scheme is changed in a conventional method.
FIG. 13 is a diagram illustrating experimental conditions that are used when a vertical revetment is installed.

FIG. 12 is a diagram illustrating wave heights obtained when the kernel function, the equation of motion, or the time integration scheme is changed in the conventional method. In FIG. 12, a case is illustrated that an equation that satisfies the above (A) to (C) is used as the conventional method, and (A) to (C) are changed to the kernel function given by Equation (1) used in the embodiment, the equation of motion given by Equation (5), and the time integration using the Symplectic Euler method, respectively. In FIG. 12, the horizontal axis represents time and the vertical axis represents wave height.

Here, a thick bold line 611 indicates the hydraulics model test, a thin bold line 612 indicates the conventional method, a dotted line 613 indicates a case that the kernel function is changed, a chain line 614 indicates a case that the equation of motion is changed, and a two-dot chain line 615 indicates a case that the time integration scheme is changed.

As can be seen from FIG. 12, the thick bold line 611 and the thin bold line 612 are the most deviated from each other. When the kernel function, the equation of motion, or the time integration scheme is changed, the result more approaches the thick bold line 611 than the thin bold line 612. Among them, the dotted line 613 indicating a change in the kernel function is the most approximate to the thick bold line 601.

That is, using the quintic spline function represented by Equation (1) as the kernel function is the most advantageous to improve the accuracy of the simulation.

To examine the influence of returning waves from the revetment, a comparison was performed between a hydraulics model test with a vertical revetment and a result of numerical analysis by the simulation according to the embodiment. As experimental conditions, the following two conditions, that is, an "inland-sea condition" and an "open-sea condition", were set. FIG. 13 is a diagram illustrating experimental conditions that are used when the vertical revetment is installed. As the "inland-sea condition" and the "open-sea condition", values illustrated in FIG. 13 were used.

Figure 14:
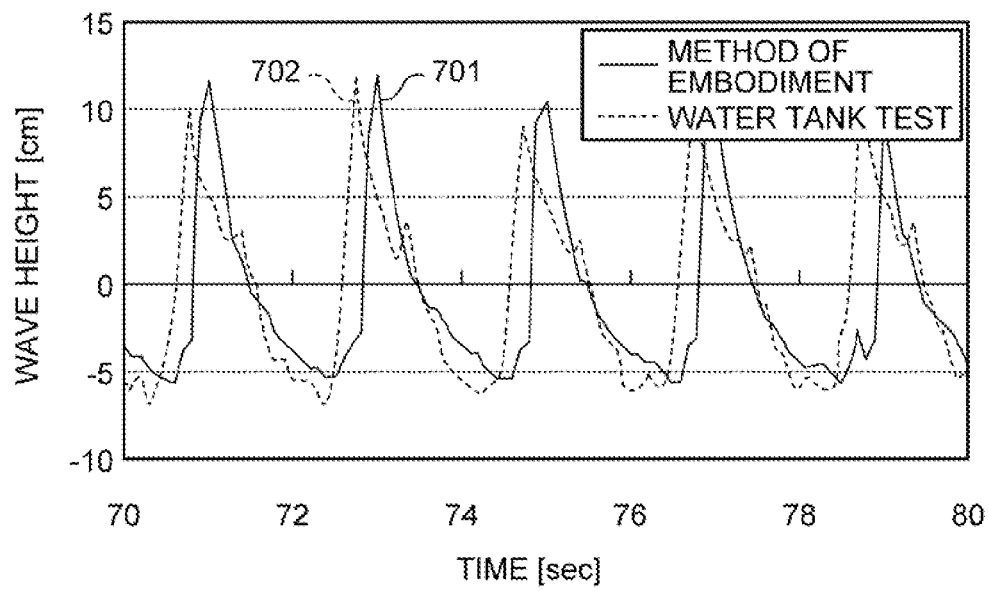
FIG. 14 is a diagram illustrating wave height histories under an open-sea condition.
Figure 15:
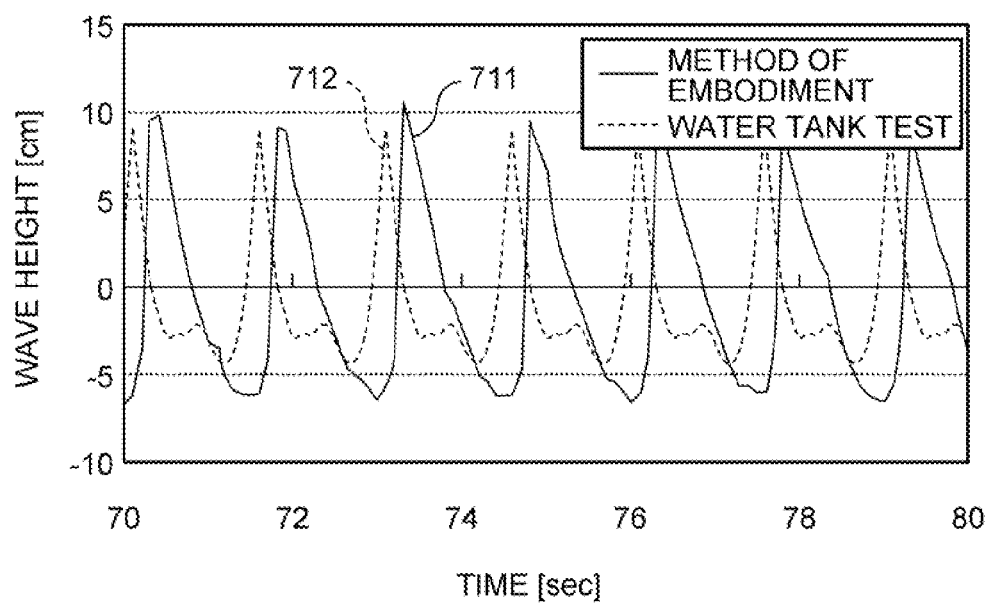
FIG. 15 is a diagram illustrating wave height histories under an inland-sea condition.

FIG. 14 is a diagram illustrating wave height histories under the open-sea condition. FIG. 15 is a diagram illustrating wave height histories under the inland-sea condition. In FIG. 14 and FIG. 15, the horizontal axis represents time and the vertical axis represents wave height. A bold line 701 and a bold line 711 represent results of the numerical analysis using the simulation method of the embodiment. A dotted line 702 and a dotted line 712 represent results of the hydraulics model tests.

In FIG. 14, the bold line 701 and the dotted line 702 are sufficiently approximate to each other in terms of the wave height, the cycle, and the waveform. In FIG. 15, the bold line 711 and the dotted line 12 are sufficiently approximate to each other in terms of the wave height, the cycle, and the waveform. That is, in the numerical analysis using the simulation method of the embodiment, the hydraulics model test involving the wave height, the cycle, and the wave form is sufficiently reproduced.

As described above, when the numerical analysis using the simulation method of the embodiment and the numerical analysis using the conventional particle method are compared with each other, the wave height of the latter method is largely attenuated compared with a result of the hydraulics model test, but the wave height of the former method is little attenuated and approximately matches the wave height of the hydraulics model test. If the simulation method of the embodiment is used, the wave height approximately matches reality even in the area on the front side of the revetment, where nonlinear nature is high and wave breaking occurs. Therefore, in a hydraulics model test using a wave generation tank, which is performed to examine the wave overtopping rate or the impact pressure in a wave breaking process at the revetment, if the numerical analysis by the simulation method of the embodiment is performed, it becomes possible to replace the hydraulics model test with the simulation, enabling to reduce the number of the hydraulics model tests. Furthermore, it becomes possible to directly evaluate response to waves in the real ocean. As a result, it is possible to largely contribute to reduction and rationalization of design costs for revetments.

The various processes explained in the above embodiment can be realized by causing a computer to execute a preset program. In the following, with reference to FIG. 16, an explanation is given of an exemplary computer that executes a simulation program with the same functions as those of the simulation apparatus illustrated in FIG. 1.

Figure 16:
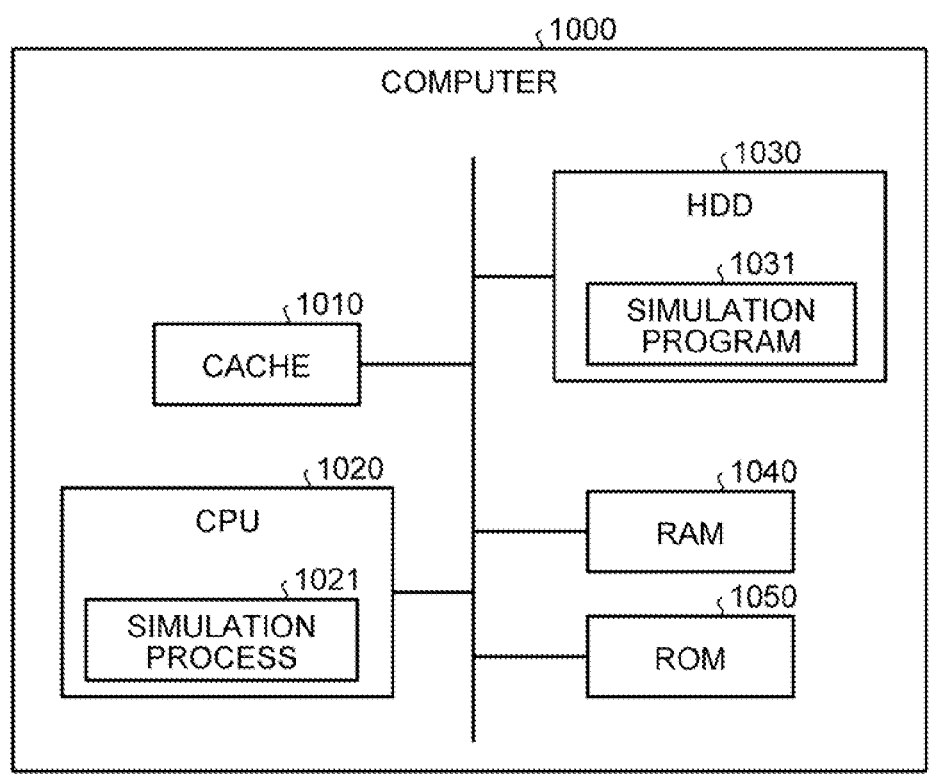
FIG. 16 is a diagram illustrating a computer that executes a simulation program.

FIG. 16 is a diagram illustrating a computer that executes the simulation program. As illustrated in FIG. 16, a computer 1000 includes a cache 1010, a central processing unit (CPU) 1020, a hard disk drive (HDD) 1030, a random access memory (RAM) 1040, and a read only memory (ROM) 1050. The cache 1010, the CPU 1020, the HDD 1030, the RAM 1040, and the ROM 1050 are connected to one another via a bus.

The HDD 1030 pre-stores therein various simulation programs 1031 that exerts the same functions as those of the simulation apparatus illustrated in FIG. 1.

The CPU 1020 reads and executes the simulation programs 1031. As illustrated in FIG. 16, the simulation program 1031 is implemented as a simulation process 1021.

The simulation program 1031 described above is not necessarily stored in the HDD 1030. For example, the simulation program 1031 may be stored in a "portable physical medium", such as a flexible disk (FD), a compact disc read only memory (CD-ROM), a digital versatile disc (DVD), a magnetooptical disk, or an integrated circuit (IC) card, to be inserted into the computer 1000. The simulation program 1031 may be stored in a "fixed physical medium", such as a hard disk drive (HDD), arranged inside or outside of the computer 1000. The simulation program 1031 may be stored in a "different computer (or server)" connected to the computer 1000 via a public line, the Internet, a local area network (LAN), a wide area network (WAN), or the like. The computer 1000 may read the program from the above-described flexible disk or the like.

According to an aspect of the simulation method, the simulation apparatus, and the simulation program described in the present application, it is possible to perform analysis in which wave height is not attenuated and approximate to reality, and to reduce the number of execution of a hydraulics model test.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A simulation method of analyzing a state of each of particles that comprise a set that represents a continuum, the simulation method comprising:

calculating, using a processor, acceleration of each of the particles and a repulsive force applied to each of the particles from a boundary surface, by using an equation of motion that is discretized by a kernel function representing a degree of contribution of one of the particles to influence on the other particles, based on input initial values of velocity, density, pressure, and a position of each of the particles;

calculating, using a processor, velocity of each of the particles after a unit time based on a current position of each of the particles by performing time integration on current velocity at the current position of each of the particles based on the calculated acceleration and the calculated repulsive force;

calculating a density time differential of each of the particles by using a continuity equation that is discretized by the kernel function so as to represent a temporal change in the density of the continuum;

calculating, using the processor, density of each of the particles after the unit time by performing time integration on the calculated density time differential of each of the particle by using the velocity of each of the particles after the unit time based on the current position of each of the particles;

performing smoothing on the density of each of the particles after the unit time, once every predetermined number of calculations of the density of each of the particles;

calculating, using the processor, pressure of each of the particles after the unit time by using an equation of state based on the density of each of the particles after the unit time;

calculating, using the processor, a position of each of the particles after the unit time by performing time integration based on the velocity of each of the particles after the unit time based on the current position of each of the particles; and acquiring velocity, density, pressure, and a position of each of the particles per unit time by repeating the calculations of the velocity, the density, the pressure, and the position of each of the particles from the initial state till an end of a predetermined time;

wherein the acceleration is represented by $$\frac{dv_a}{dt} = -\sum_b m_b \left( \frac{p_b + p_a}{\rho_b \rho_a} \right) \nabla_a W_{ab}$$

$$-\sum_b m_b \left( \frac{\beta_{av} \phi^2}{\rho_{ab}} \right) \nabla_a W_{ab},$$

$$+g$$

where a subscript a indicates information on a particle a, where a subscript b indicates information on a particle b, where the particle a is a particle that is arbitrarily extracted from the particles, where the particle b is a neighboring particle of the particle a, where $\rho_a$ is a density of the particle a, where $\rho_b$ is a density of the particle b, where $\rho_{ab}$ represents an arithmetic average of $\rho_a$ and $\rho_b$, where $p_a$ is a pressure applied to the particle a, where $p_b$ is a pressure applied to the particle b, where $W_{ab}$ is a kernel function with the particle a and the particle b where $\nabla_a$ represents a vector differential operator at the position of the particle a, where $m_b$ is a mass of the particle b, and where a term g represents an external force term.

2. The simulation method according to claim 1, wherein the kernel function is given such that a value of integral performed all over space is 1, a limit is given by a Dirac delta function when the influence area approaches zero, and a first order differential is possible.

3. The simulation method according to claim 1, wherein the kernel function is a Gaussian function that represents the degree of contribution of one of the particles to the influence on the other particles by a normal distribution.

4. The simulation method according to claim 1, wherein the kernel function is quintic spline function that give zero outside a finite domain.

5. The simulation method according to claim 1, wherein the discretized equation of motion represents acceleration that depends on a pressure gradient such that the acceleration decreases as the density increases.

6. The simulation method according to claim 5, wherein the discretized equation of motion satisfies a Hamilton equation.

7. The simulation method according to claim 5, wherein the discretized equation of motion is transformed by using an adjustment parameter so as to give a symmetrical form with respect to each of the particles.

8. The simulation method according to claim 7, wherein a value of the adjustment parameter is one.

9. The simulation method according to claim 7, wherein a value of the adjustment parameter is zero.

10. A simulation apparatus that analyzes a state of each of particles that comprise a set that represents a continuum, the simulation apparatus comprising:
a processor and a memory,
wherein the processor includes
a velocity calculating unit that calculates acceleration of each of the particles and a repulsive force applied to each of the particles from a boundary surface by using an equation of motion that is discretized by a kernel function representing a degree of contribution of one of the particles to influence on the other particles; and that calculates velocity of each of the particles after a unit time based on a current position of each of the particles by performing time integration on current velocity at the current position of each of the particles based on the calculated acceleration and the calculated repulsive force of each of the particles;
a density calculating unit that calculates a density time differential of each of the particles by using a continuity equation that is discretized by the kernel function so as to represent a temporal change in the density of the continuum; and calculates density of each of the particles after the unit time by performing time integration on the calculated density time differential of each of the particle by using the velocity of each of the particles after the unit time based on the current position of each of the particles;
a smoothing unit that smooths on the density of each of the particles after the unit time, once every predetermined number of calculations of the density of each of the particles;
a pressure calculating unit that calculates pressure of each of the particles after the unit time by using an equation of state based on the density of each of the particles after the unit time;
a position calculating unit that calculates a position of each of the particles after the unit time by performing time integration based on the velocity of each of the particles after the unit time based on the current position of each of the particles; and
a control unit that causes each unit to repeat the calculation of the velocity, the density, the pressure, or the position after per unit time from the initial state till an end of a predetermined time; and acquires the calculated velocity, density, pressure, and position per unit time;
wherein the acceleration is represented by $$\frac{dv_a}{dt} = -\sum_b m_b \left( \frac{p_b + p_a}{\rho_b \rho_a} \right) \nabla_a W_{ab}$$

-continued
$$-\sum_b m_b \left( \frac{\beta_{av} \phi^2}{\rho_{ab}} \right) \nabla_a W_{ab},$$
$$+g$$

where a subscript a indicates information on a particle a, where a subscript b indicates information on a particle b, where the particle a is a particle that is arbitrarily extracted from the particles, where the particle b is a neighboring particle of the particle a, where $\rho_a$ is a density of the particle a, where $\rho_b$ is a density of the particle b, where $\rho_{ab}$ represents an arithmetic average of $\rho_a$ and $\rho_b$, where $p_a$ is a pressure applied to the particle a, where $p_b$ is a pressure applied to the particle b, where $W_{ab}$ is a kernel function with the particle a and the particle b, where $\nabla_a$ represents a vector differential operator at the position of the particle a, where $m_b$ is a mass of the particle b, and where a term g represents an external force term.

11. A non-transitory computer-readable storage medium storing a simulation program for directing a computer to perform a process for analyzing a state of each of particles that comprise a set that represents a continuum, the process comprising:
calculating acceleration of each of the particles and a repulsive force applied to each of the particles from a boundary surface by using an equation of motion that is discretized by a kernel function representing a degree of contribution of one of the particles to influence on the other particles, based on input initial values of velocity, density, pressure, and a position of each of the particles;
calculating velocity of each of the particles after a unit time based on a current position of each of the particles by performing time integration on current velocity at the current position of each of the particles based on the calculated acceleration and the calculated repulsive force;
calculating a density time differential of each of the particles by using a continuity equation that is discretized by the kernel function so as to represent a temporal change in the density of the continuum;
calculating density of each of the particles after the unit time by performing time integration on the calculated density time differential of each of the particle by using the velocity of each of the particles after the unit time based on the current position of each of the particles;
performing smoothing on the density of each of the particles after the unit time, once every predetermined number of calculations of the density of each of the particles;
calculating pressure of each of the particles after the unit time by using an equation of state based on the density of each of the particles after the unit time;
calculating a position of each of the particles after the unit time by performing time integration based on the velocity of each of the particles after the unit time based on the current position of each of the particles; and
acquiring velocity, density, pressure, and a position of each of the particles per unit time by repeating the calculations of the velocity, the density, the pressure, and the position of each of the particles from the initial state till an end of a predetermined time;

wherein the acceleration is represented by $$\frac{dv_a}{dt} = -\sum_b m_b \left(\frac{p_b + p_a}{\rho_b \rho_a}\right) \nabla_a W_{ab}$$
$$-\sum_b m_b \left(\frac{\beta_{av}\phi^2}{\rho_{ab}}\right) \nabla_a W_{ab},$$
$$+g$$

where a subscript a indicates information on a particle a, where a subscript b indicates information on a particle b, where the particle a is a particle that is arbitrarily extracted from the particles, where the particle b is a neighboring particle of the particle a, where $\rho_a$ is a density of the particle a, where $\rho_b$ is a density of the article b where $\rho_{ab}$ represents an arithmetic average of $\rho_a$ and $\rho_b$, where $p_a$ is a pressure applied to the particle a, where $p_b$ is a pressure applied to the particle b, where $W_{ab}$ is a kernel function with the particle a and the particle b, where $\nabla_a$ represents a vector differential operator at the position of the particle a, where $m_b$ is a mass of the particle b, and where a term g represents an external force term.

* * * * *